March 15, 1966     H. L. WOOD     3,240,525
VACUUM DEVICE FOR HANDLING ARTICLES
Filed Dec. 13, 1963     2 Sheets-Sheet 2
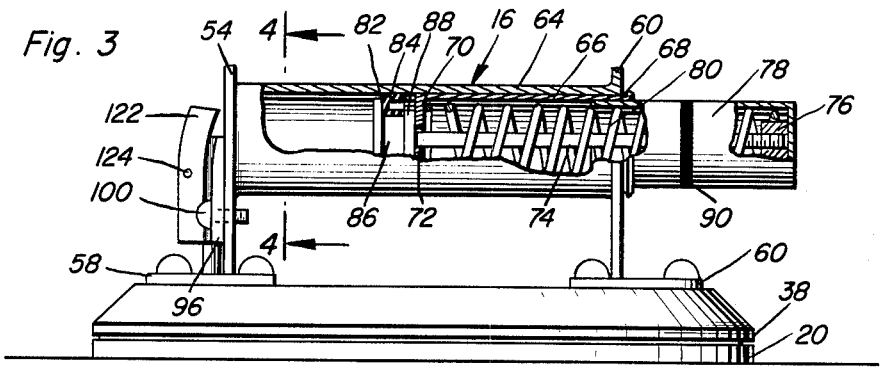
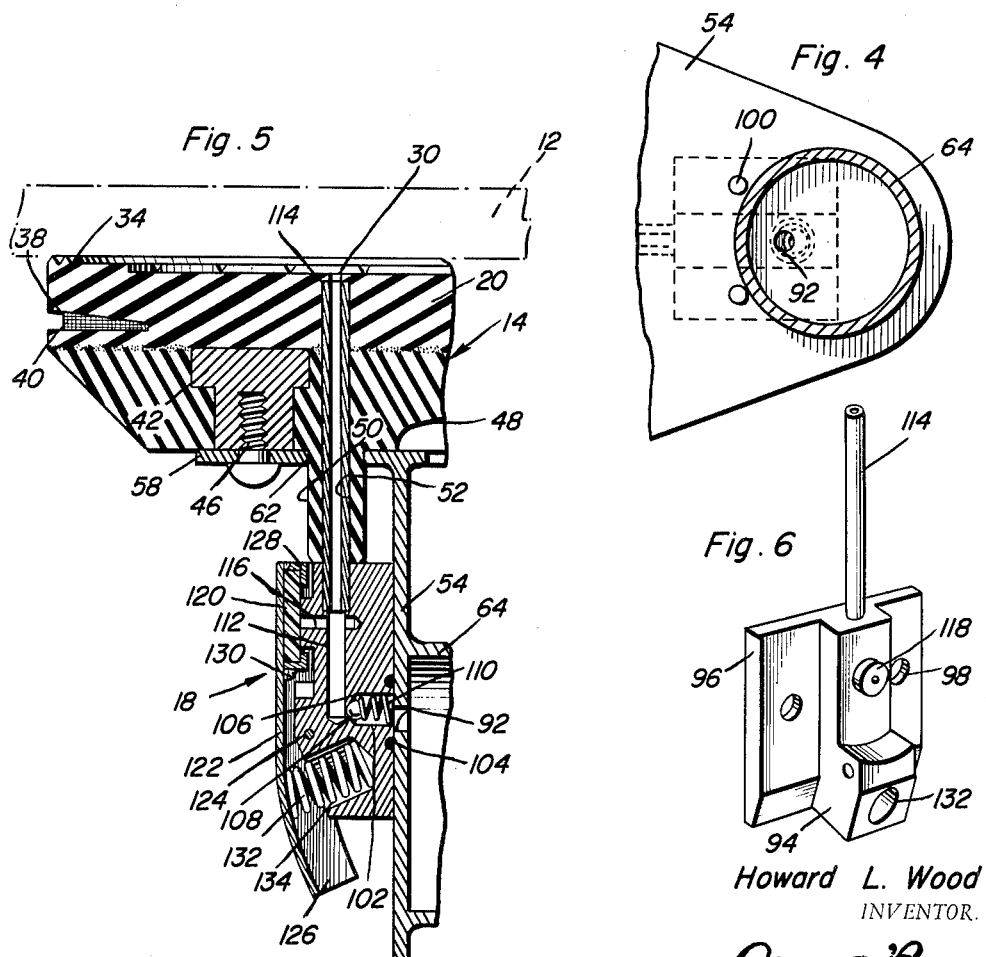
Howard L. Wood
INVENTOR.

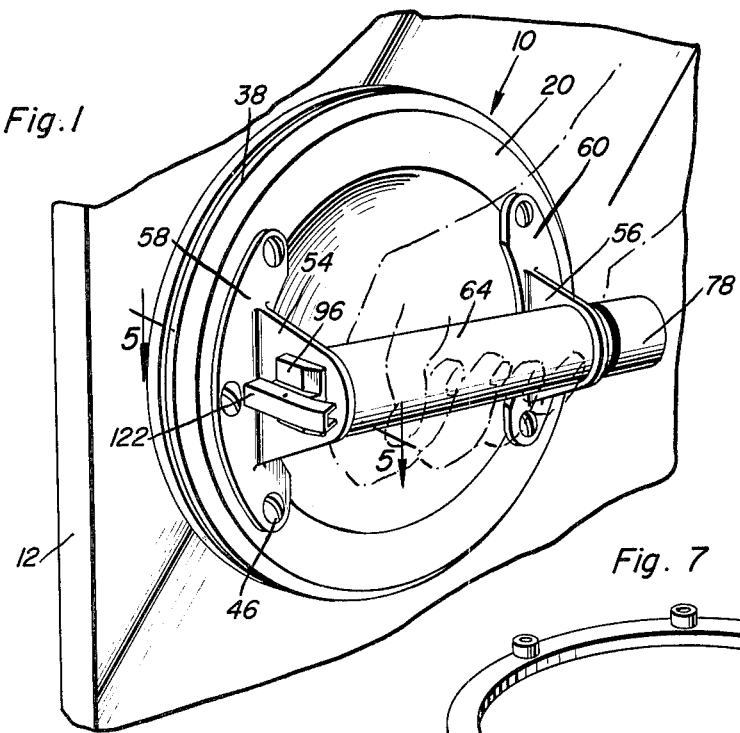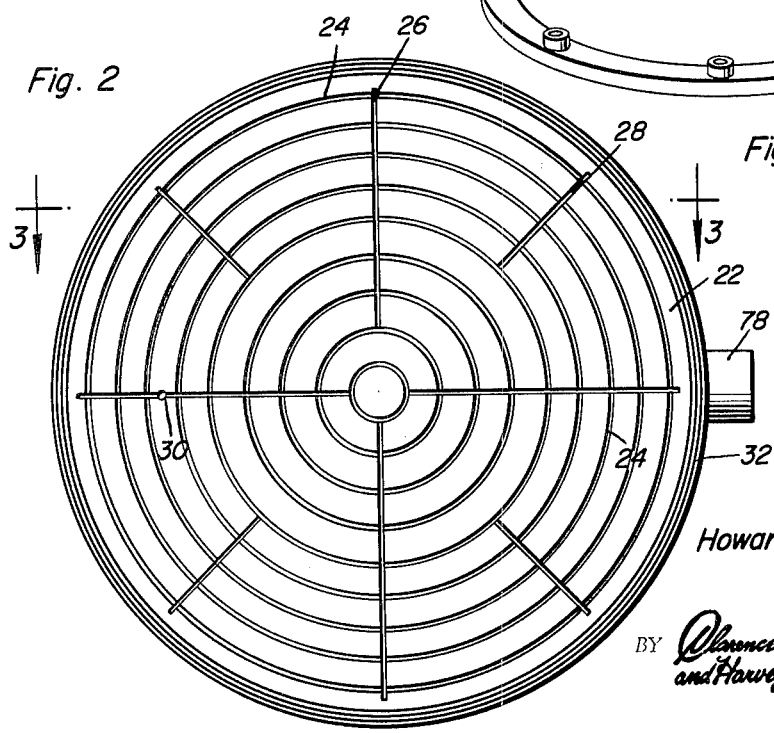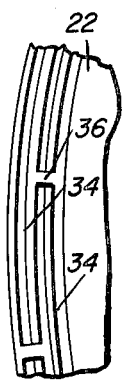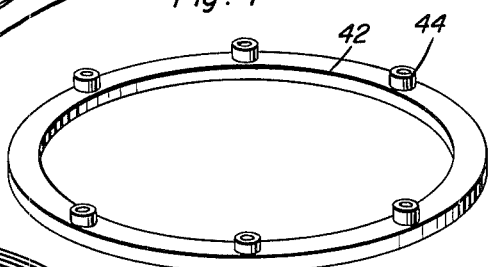
Howard L. Wood
INVENTOR.

United States Patent Office 3,240,525
Patented Mar. 15, 1966

1

3,240,525
VACUUM DEVICE FOR HANDLING ARTICLES
Howard L. Wood, Wolf Point, Mont., assignor to Wood's Powr-Grip Co., Inc., Wolf Point, Mont., a corporation of Montana
Filed Dec. 13, 1963, Ser. No. 330,364
7 Claims. (Cl. 294—64)

This present invention generally relates to an article handling device and more particularly a gripping device employing a vacuum principle for attaching the gripping device to an article having a relatively smooth surface area. The present invention may be employed for gripping and handling various articles having smooth surfaces such as sheet panels of glass, metal or the like.

Inasmuch as article handling devices employing a vacuum principle have been previously known, the present invention incorporates novel structural features therein to enable production of a device of this nature having increased safety factors therein thereby enabling such gripping devices or pick up units to be employed in a wider range of utility in view of the reliable and safe manner of attachment to the article being handled or picked up.

Another object of the present invention is to provide a vacuum pick up device or article handling device particularly adapted for but not limited to use with sheet glass and which is provided with a gripping pad surface or face that is interlaced with rather shallow evacuating grooves so as to allow a relatively small pump attached thereto to evacuate the pad surface to a relatively high degree without undue pumping effort. The gripping pad surface or face is provided with a sealing edge at the circumference thereof with the sealing edge having a plurality of multiple circumferential pressure ridges that have spaces therebetween blocked out at short intervals to the height of the ridges for the purpose of blocking passage of air which has passed a leaking portion of one ridge to another portion of the next inner ridge thereby confining the leak circumferentially of the ridges and also radially of the ridges thereby maintaining a more effective seal for the pad surface.

A further object of the present invention is to provide a vacuum handling device including a gripping pad of resilient material constructed in accordance with the preceding objects and including a peripheral slit parallel to the surface of the gripping pad which extends circumferentially around the pad but above the plane of the face thereof with the slit or groove being sufficiently close to the plane of the face to allow the sealing edge of the face of the pad a relatively high degree of flexibility which allows it to conform to irregularities in the surface and this groove also allows atmospheric pressure against the lip formed thereby for holding the sealing edge in contact with the surface to which it is sealed to even in the event of distortion of the gripper pad or other surface being gripped.

Yet another important object of the present invention is to provide an article handling device in accordance with the preceding objects in which the gripping pad unit is provided with an internal structure having a combination pump and handle assembly of a low profile character attached thereto adjacent the outer circumference of the pad thereby enabling the center part of the pad to be thinned to allow sufficient hand space under the low profile handle which has the pump incorporated therein for providing advantages as concerns lifting force being applied in a direction parallel to the face inasmuch as the handle will be adjacent to the face for decreasing the force arm formed by the lifting force exerted on the handle.

Still another important feature of the present invention is to provide a vacuum device in accordance with the preceding objects in which the pump is spring operated in which the spring tension is opposed to atmospheric pressure and is less than required to overcome average atmospheric pressure when the spring is in fully strained position. This proportioning of the spring tension allows the pump plunger position to become a visual indicator of lowered evacuation within the head surface and also indicates the intensity of the grip. In other words, any leakage of air to the evacuated section causes increased internal pressure to assist the spring in moving the pump piston outwardly against normal atmospheric pressure thus allowing outward projection of the movable pump piston to register the intensity or degree of evacuation. In order to provide a more easily visible indicator, the pump piston is provided with a colored section which can register the point of minimum safe attachment.

Still another feature of the present invention is to provide an article handling device incorporating a vacuum pump and attaching pad all of which is rather compact in structure, easy to use, safe and effective in operation and relatively inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the article handling device of the present invention;

FIGURE 2 is an elevational view of the attaching pad surface;

FIGURE 3 is a plan view taken generally upon a plane passing along section line 3—3 of FIGURE 2 with portions of the vacuum pump being illustrated in section;

FIGURE 4 is a transverse, sectional view taken substantially upon a plane passing along section line 4—4 of FIGURE 3 illustrating further structural details of the pump;

FIGURE 5 is a detailed sectional view taken substantially upon a plane passing along section line 5—5 of FIGURE 1, on an enlarged scale, illustrating the specific structure of the air passageways and valve structure for release from the vacuum when desired;

FIGURE 6 is a perspective view illustrating the valve body structure;

FIGURE 7 is a perspective view of the reinforcing ring embedded in the pad and illustrating the structure thereof for attachment of the pump unit; and FIGURE 8 is an enlarged fragmental view of the sealing edge of the gripping pad.

Referring now specifically to the drawings, the numeral 10 generally designates the article handling device of the present invention which is specifically adapted to pick up and handle articles 12 having smooth exterior surface such as panels of glass or the like. It is pointed out that the device may be used for various purposes in which a relatively smooth clean surface is provided whereby the handling device of the present invention may be securely attached thereto and will remain attached thereto in a safe and effective manner.

The device 10 includes a gripping pad generally designated by numeral 14, a vacuum pump 16 and a valve structure 18 all constructed in such a manner that a compact low profile unit is provided which will be easy to handle and control.

The pad 14 is a generally circular body of resilient material 20 such as rubber or the like. The face or gripping surface of the pad 20 is designated by numeral 22 and includes a plurality of radially spaced concentric grooves 24 therein which are relatively shallow and which are communicated by a plurality of radial grooves 26 which are also relatively shallow but which are slightly deeper than the grooves 24. The grooves 26 extend from the innermost groove 24 and communicate with the outermost groove 24 thus forming a network or pattern of inter-communicated grooves in the face 22 with the grooves being of such minute section as to allow the vacuum pump 16 to evacuate the space between the attaching face 22 and the surface of the article 12 to a high degree of vacuum without undue pumping effort. The face 22 is also provided with partial radial grooves 28 which extend from the outermost groove to an intermediate groove for further communicating the grooves with the shorter radial grooves 28 being staggered between the longer radial grooves 26 which are located at 90 degree intervals. One of the radial grooves 26 is provided with an opening 30 communicated therewith through which the air is evacuated from the pad face 22 in a manner described hereinafter.

The outer periphery of the pad face 22 is provided with a sealing edge 32 which includes three closely spaced circumferential ridges 34 as illustrated particularly in FIGURE 5 and in FIGURE 8. The ridges 34 are generally V-shaped in configuration and form a multiple sealing edge for the gripping face 22. At circumferentially spaced points, adjacent ridges 34 are interconnected by bridging areas 36 which serve to block off certain sections of the peripheral grooves or spaces defined by the ridges 34. Thus, if a leak occurs at the outermost ridge, this leak will not spread circumferentially in the groove between the outermost and intermediate ridge 34 inasmuch as the bridging areas or portions 36 will block off or seal the leaking portion. Thus, in order for any air to leak past the three ridges, the air must travel generally in a straight radial path thereby eliminating any possibility of air leaking past one ridge and then passing circumferentially to a leaking portion of an intermediate ridge. This construction provides a more effective seal to the periphery of the pad face 22.

Also, the pad 20 is provided with a peripheral or circumferential generally V-shaped groove or slit 38 formed in the periphery thereof and spaced away from the sealing lip 32. The groove or slit 38 provides a high degree of flexibility for the lip of the pad 30 thus enabling more effective sealing. Also, the groove 38 enables atmospheric pressure to be exerted directly against the surface thereof nearest the attaching face 22 of the pad 20 for more effectively holding the pad 20 in sealed engagement with the surface to be picked up. The slitted edge is actually a knife-cut and is provided with a thin inserted porous filler strip 40 bonded to one surface of the slit 38 for retention therein. The porous material 40 which may be felt or the like assists in retaining a definite separation of the surfaces of the slit thereby assuring entry of atmospheric pressure to the back side of the sealing lip 32.

Embedded in the pad 20 is a rigid metal ring 42 disposed adjacent but inwardly of the peripheral plane of the sealing lip 32 and also spaced inwardly of the slit 38. The ring 42 is provided with a plurality of internally threaded studs 44 integral therewith which receives fastening screws 46 for securing the pump assembly 16 to the pad 20. The pad 20 also has a thin central area 48 and a projecting tubular portion 50 which defines a passageway continuous with a passageway 52 that communicates with the opening 30 in the pad face 22 as illustrated in FIGURE 5.

The pump assembly includes a pair of bracket plates 54 and 56 each of which is provided with an arcuate attaching base 58 and 60. The base 58 is provided with three attaching screws 46 while the base 60 is provided with attaching screws 46 for attaching the bracket plates 54 and 56 to the ring 42. The plate 58 is provided with an aperture 62 which receives the tubular projection 50 on the pad 20 for a purpose described hereinafter. The outer end of the bracket 54 is rigidly affixed to and forms a closure for one end of a pump cylinder 64 which also forms a handle inasmuch as the other end of the pump cylinder 64 is rigidly affixed to the bracket 56 with the bracket 56 having an opening therein conforming with and forming a continuation of the pump cylinder 64. A sleeve liner 66 is disposed within the open end of the pump cylinder 64 and is frictionally retained therein with the liner 66 having an outwardly flared end potrion 68 presenting complete insertion of the liner 66 into the pump cylinder 64. The inner end of the liner 64 is provided with an inturned flange 70 having a central opening 72 receiving a piston rod 74 having the opposite end thereof screwthreadedly attached to an internally threaded stud 76 mounted on the internal end surface of the tubular pump plunger 78 that is reciprocally slidably mounted within the liner 66 as illustrated in FIGURE 3. In encircling relation to piston rod 74 is a coil spring 80 having one end thereof abutting the inturned flange 70 and the other end thereof abutting the closed end of the plunger 78 in encircling relation to the internally threaded socket 76. At the end of the piston rod 74 which projects through the opening 62, there is provided a piston 82 having a resilient seal or ring 84 of generally U-shaped transverse cross-sectional configuration received within a groove 86 and held in the groove by a flange member 88 which cooperates with the piston 80 to retain the seal member 84 in place. The seal member 84 effectively engages the interior of the pump cylinder 64 so that upon reciprocation of the plunger 78, the piston will reciprocate thus forming a pump for pumping air in a manner described hereinafter. Also, the plunger 78 provided with an annular colored band 90 thereon which serves the purpose of indicating the degree of intensity of the evacuation of the pad surface 22 in a manner described hereinafter and the bracket 54 is provided with an aperture 92 in offset relationship to the center of the pump cylinder 64 and the valve assembly 18 is associated with the aperture 92 in a particular manner.

The valve assembly 18 includes a valve block or body 94 integral with a mounting plate 96 having apertures 98 therein receiving fastening screws 100 which extend through corresponding apertures in the bracket 54 for attaching the valve body 94 to the bracket 54. The valve body 94 includes a passageway 102 in communication with the aperture 92 and an O-ring seal 104 is disposed in encircling relation to the aperture 92 and in encircling relation to the entrance end of the passageway 102 thereby sealing the passageway 102 in relation to the aperture 92 when the plate 96 is secured to the bracket 54 by virtue of the screws 100.

The inner end of the passageway or recess 102 is inclined at 106 for receiving a ball check valve 108 that is retained in place by a ball check valve coil spring 110. The ball check valve 108 is preferably constructed of nylon or similar material and allows air to enter the pump-cylinder 64 through the opening 92 but prevents air from entering a passageway 112 extending perpendicularly to the passageway 102 inasmuch as the ball check valve 108 forms a closure against the valve seat 106.

As illustrated in FIGURE 5, the passageway 102 is offset in relation to the opening 92 but still in communication therewith and this particular orientation is provided in order to assure that the spring 110 and ball check valve will not pass through the aperture 92.

The passageway 112 is in communication with a tube 114 attached to the valve plate or body 94 and is soldered or sweated thereto and the tube 114 is received in the passageway 52 and the tubular projection 50 encircles the tube 114 from the end of the valve body 94 to the mounting plate 58. Just inwardly of the tube 114, the valve body 94 is provided with a passageway 116 in communication with the passageway 112 and terminating in a projection in the form of a valve 118 for engagement by a sealing disk 120 of rubber or similar resilient material carried by a valve handle 122 pivotally supported from the body by virtue of a pivot pin 124 which not only extends through the projection portion of a valve body 94 but also through the side flanges 126 of the handle 122 which is substantially of U-shaped transverse configuration. The sealing disk 120 is retained in place by L-shaped lugs 128 secured to the handle 122 by soldering 130 or the like and the disk 120 may be either circular or in a square with the L-shaped retaining flanges 128 engaging only the end edges of the disk. A compression coil spring 132 engages an inner side of the handle where it curves inwardly on the opposite side of the pivot point 124 from the sealing disk 120. The other end of the spring 132 is received in an inclined recess 134 formed in the valve body 94 whereby the spring will be guided during its operation.

As illustrated, the pump cylinder 64 forms a handle for manipulation of the device and also forms a low profile structure so that the point of application of lifting force will be as close as possible to the surface of the panel or an article being lifted. This is especially significant when carrying glass panels inasmuch as the lifting arm will be relatively short. Also, the spring which urges the pump plunger outwardly is calibrated to counteract atmospheric pressure so that the plunger will be urged back outwardly when the vacuum on the attaching face of the pad is released. Thus, by observing the colored bands, the tensity or degree of the vacuum on the attaching face of the pad may be determined. In other words, when the face has been evacuated to a high degree, the plunger will remain inwardly with the colored band concealed within the liner 66. However, as the vacuum decreases in intensity, the spring will urge the plunger outwardly and the colored band 90 can thus be used as an indicator for the degree of the intensity of the vacuum and thus form an indicator for indicating the degree of safety of the attachment of the handling device to the article being handled.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be reserted to, falling within the scope of the invention as claimed.

What is claimed as new is as follows:

1. A device for handling objects having a substantially smooth surface comprising a vacuum attaching pad having an attaching face with a peripheral seal means thereon, a handle attached to said pad, and an air evacuating pump incorporated into said handle and communicated with the attaching surface of the pad for exhausting air from the attaching surface inwardly of said seal means, said seal means including a plurality of peripheral ribs on the attaching surface, adjacent peripheral ribs being interconnected at circumferentially spaced points by a plurality of radially disposed ridges adapted to block off certain sections of the peripheral grooves defined by said peripheral ribs, said attaching surface having a plurality of communicating shallow grooves extending radially and circumferentially thereof inwardly of the sealing ribs whereby the complete surface area of the attaching surface inwardly of the sealing ribs may be communicated with the air evacuating pump, said pad having a radial slit disposed in the upstanding peripheral edge thereof for increasing the flexible character of the attaching face and also enabling atmospheric air to engage the inner edge of the slit for holding the sealing ribs securely against the article being carried.

2. The device as defined in claim 1 wherein said slit is provided with a filler or porous material to prevent the slit from closing and enabling atmospheric air to engage the surface of the slit for holding the sealing ribs onto the surface of the article being carried.

3. The device as defined in claim 2 wherein a reinforceing ring is embedded in said pad inwardly of the slit for retaining the configuration of the pad, said handle with the pump incorporated therein being attached to said annular reinforcing ring.

4. The device as defined in claim 3 wherein said handle includes a tubular member forming a pump cylinder disposed parallel to the attaching face of the pad, brackets on each end of the cylinder attached to the annular reinforcing ring, a sleeve inserted into one end of the pump cylinder, the other end of said pump cylinder including means communicating with the attaching face of the pad, a plunger received in said dump cylinder inwardly of the sleeve and having an operating rod projecting longitudinally outwardly of the pump cylinder and terminating in a knob for actuation, spring means biasing said plunger outwardly of the cylinder whereby the knob may be reciprocated by exerting longitudinal pressure thereon and then releasing the pressure for pumping air from the attaching face of the pad, said handle cooperating with the pad for providing a low profile unit with a short force arm from the handle to the attaching surface.

5. The device as defined in claim 4 wherein said knob is provided with a colored indicating ring thereon and the spring means is calibrated to exert a predetermined outward pressure on the plunger so that the knob will be held inwardly of the cylinder with the colored indicator ring concealed when an effective vacuum is induced between the attaching face of the pad and the surface of the article being carried thereby providing a safety indicator for the device.

6. The device as defined in claim 5 wherein said means communicating the pump cylinder with the attaching face of the pad includes a resilient tubular member integral with the pad, a valve body having a projecting tubular stem telescoped and sealed to the flexible tubular member and being sealed to the pump cylinder, a check valve in said valve body for enabling the operation of the pump plunger for evacuating air from the attaching face of the pad.

7. The device as defined in claim 6 wherein a vent opening is provided in the valve body between the check valve and the attaching face of the pads for enabling inlet of air to communicate the atmosphere with the attaching face of the pad to release the pad, and a spring biased hand operated valve member pivotally mounted on the valve body and normally closing said vent opening for enabling operation of the pump to evacuate from the attaching surface of the pad, said handle being manually operable for opening the vent opening for reducing the vacuum in the space between the attaching pads and the surface of the device being carried for releasing the pad therefrom.

References Cited by the Examiner

UNITED STATES PATENTS

| | | | |
|---|---|---|---|
| 1,757,529 | 5/1930 | Jones | 294—64 |
| 2,850,279 | 9/1958 | Stoothoff | 294—64 X |

FOREIGN PATENTS 294,367   1/1954   Switzerland.

GERALD M. FORLENZA, *Primary Examiner.*

SAMUEL F. COLEMAN, *Examiner.*